Sept. 7, 1965 L. L. CARPENTER 3,205,289
PROCESS FOR IMPROVING BURSTING STRENGTH OF PLASTIC PIPE
Filed July 18, 1961 2 Sheets-Sheet 1

INVENTOR.
LOUIS L. CARPENTER
BY
Walter C. Kehm
ATTORNEY

Sept. 7, 1965　　　　L. L. CARPENTER　　　3,205,289
PROCESS FOR IMPROVING BURSTING STRENGTH OF PLASTIC PIPE
Filed July 18, 1961　　　　　　　　　　　　2 Sheets-Sheet 2

INVENTOR.
LOUIS L. CARPENTER
BY
Walter C. Kehm
ATTORNEY

3,205,289
PROCESS FOR IMPROVING BURSTING STRENGTH OF PLASTIC PIPE
Louis L. Carpenter, Plainfield, N.J., assignor to Union Carbide Corporation, a corporation of New York
Filed July 18, 1961, Ser. No. 124,886
5 Claims. (Cl. 264—280)

This invention relates to a method of improving the bursting strength of thermoplastic pipe. More particularly, it relates to a method of working thermoplastic pipe causing the thermoplastic material of the pipe to flow and orient itself in both longitudinal and circumferential directions thereby substantially increasing its burst strength.

It is a well known physical fact that when an extruded thermoplastic pipe is subjected to internal pressure sufficient to cause pipe rupture, the rupture generally always takes place in the direction of the length of the pipe in the form of a longitudinal split rather than in the direction of the circumference of the pipe, i.e. a circumferential split. This manifestation has been primarily attributed to two interrelated factors.

By consideration of the geometry of pipes or thin-walled cylinders subjected to internal pressure, two tensile stresses 90° apart arise. They are the longitudinal tensile and the circumferential tensile stresses. The circumferential tensile stress is twice the longitudinal tensile stress, therefore, making the former stress controlling.

Since in extruded thermoplastic pipes the thermoplastic material is substantially stretched and oriented in the direction of the extrusion, an increase in resistance to circumferential splitting is effected. This longitudinal orientation increases the pipe's longitudinal tensile stress resistance at the expense of its longitudinal splitting resistance or circumferential tensile stress resistance, which is in fact decreased. This is, of course, undesirable because of the already greater propensity of an internally loaded pipe to burst or split along its length by reason of its geometry.

It is, therefore, a general object of this invention to improve the burst strength of thermoplastic pipes by effecting permanent orientation in a circumferential direction in the thermoplastic material so as to improve the circumferential tensile strength of extruded thermoplastic pipes and prevent longitudinal splitting.

Further objects and advantages of the present invention will be apparent to those skilled in the art from the following description and appended claims.

By the method of this invention it has now been discovered that the bursting strength of extruded thermoplastic pipes is substantially improved by simultaneously orienting the thermoplastic material in both circumferential and longitudinal directions. This is accomplished by applying sufficient deformative pressure from a rotatable pressure means adapted to transmit pressure in circumferential and longitudinal directions to the outer periphery of a pipe, deforming the same and causing the thermoplastic material to flow simultaneously in both circumferential and longitudinal directions while maintaining the thermoplastic at a temperature below its first-order transition temperature and above its second-order transition with the deformations not exceeding its ultimate tensile strength while above its yield value. The rotatable pressure means may take many forms as is shown in the figures and described in the examples. However, in every form it is of paramount importance that the pressure means effect circumferential deformation and thus orientation to increase the pipe's longitudinal splitting resistance. Thus, as employed herein, the term "rotatable pressure means" is meant to include any method or means by which circumferential pressure is applied sufficient to effect plastic flow in a circumferential direction. Also, the rotation of the pressure means may be relative, i.e. the pressure means need not rotate but instead the pipe worked upon may rotate.

There are two basic types of deformation, elastic deformation, which is temporary and disappears upon release of stress or pressure, and plastic flow, which is a permanent deformation or orientation. Upon release of pressure or stress sufficient to effect plastic flow, the thermoplastic material no longer returns to its original dimensions but has suffered a permanent set or orientation. If the pressure on the material is increased to a sufficiently high value called the yield value or elastic limit, permanent deformation (plastic flow) can be induced, i.e. above the yield value the material is no longer acting as an elastic body. This invention is concerned with pressures of working wherein they exceed the material's yield value. This information is available to those in the art or it may be obtained for any thermoplastic material from its stress/strain graph. The "yield value" from such a graph and the one contemplated herein is the stress at which a marked and permanent increase in the deformation of the thermoplastic material occurs without any increase in load or stress. Notwithstanding the method used, however, because of the ever present possibility of too great a deformation occurring or one exceeding the material's ultimate tensile strength, and thereby, permanently damaging the pipe as a result thereof, the methods of this invention are best executed by having the thermoplastic pipe advance through more than one pass with a gradual reduction and elongation taking place on each pass. If no reduction or elongation takes place as in the twisting method, described more fully below, then the twisting deformations should be done gradually, none of which exceeding the material's ultimate tensile strength. The term "pass" as used herein, means the relative progress of the entire length of a thermoplastic pipe past a pressure means adapted to act upon its outer periphery, and thereby, cold-work it.

While the invention is applicable to any extruded thermoplastic tubing or pipe, the most desirable for demonstration purposes is polyethylene because of its widespread use. It proved to react desirably by the cold-working methods of this invention. It was found with this thermoplastic material that in the cold-working method where a reduction in thickness of pipe was realized best results were accomplished when the reduction in thickness was continued until the pipe's thickness was reduced at least 15% or preferably 25% to 35%. Although the examples given hereinbelow are based on different types of polyethylene, it is obvious that the teachings of this invention can be employed with a wide variety of thermoplastics, provided they can be extruded into pipes, such as polystyrene, vinyl chloride resins, polycarbonates, polyhydroxyethers and the like.

As is disclosed in the following examples, the polyethylene was orientated over a wide temperature range, including room temperature. However, the first-order transition temperature of the polyethylene was never exceeded. The first-order transition temperature, more commonly called the softening temperature, is defined as the temperature at which the thermoplastic material changes from opaque to transparent indicating the change from the crystalline to amorphous state. Where substances free from crystallites are used, this softening temperature will merely mean the temperature at which the material changes from opaque to transparent. This softening temperature may be determined by heating the thermoplastic material under a microscope provided with testing means and by observing the material in polarized light. This first-order transition temperature is important because the only orientation of the thermoplastic material desired is that which is effectuated by the cold-working. Therefore, it is desirable that the polymer be kept at least 5 and preferably at least 10 degrees Fahrenheit below this first-order transition temperature in order to effect the best orientation and consequently, the best results. It is possible with many thermoplastics to heat them, if desired, to a plastic or orientable state in order to instill the requisite or best degree of orientation, in the most efficient way. An increase in temperature generally has the effect of decreasing the thermoplastics yield value, i.e. plastic flow is obtained with less pressure or stress applied thereon. In dealing with such materials, therefore, it may be necessary to heat the mandrel, the pressure means, or the material, either conjointly or disjointly. However, in any case the orientation must take place below the first-order transition temperature of the thermoplastic material.

The lower limit above which cold working may be effective or performed is the second-order transition temperature or brittle temperature of the polymer. As the temperature of a polymer is lowered, its rubberlike or plastic properties are gradually diminished and the material hardens until finally a point is reached at which the polymer is brittle and shatters upon sudden application of load or pressure. The temperature at which such breakage takes place is known as the second-order transition temperature and is of substantial interest in cold working, in that it represents the lower limit of the useful temperature range in which orientation can be permanently effected.

This invention will now be described with reference to the accompanying drawings.

Figure 1:
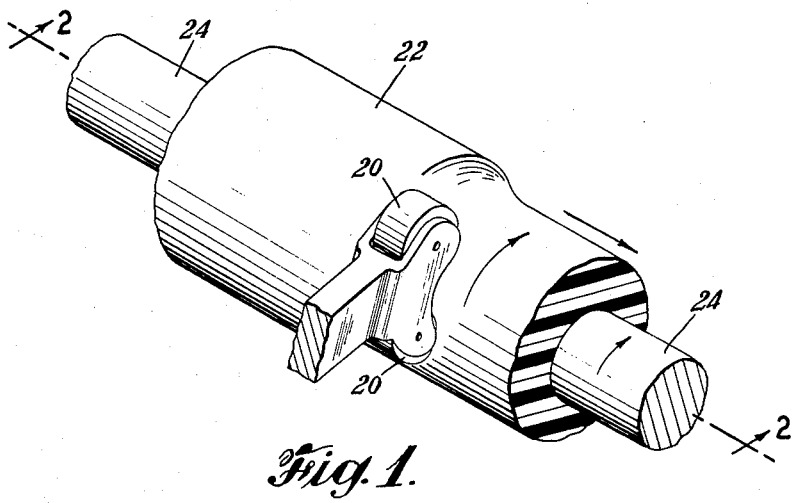
FIGURE 1 represents a perspective view of a set of rollers acting on the outer periphery of a thermoplastic pipe and FIGURE 2 is a sectional view thereof along section 2—2 of FIGURE 1.
Figure 2:
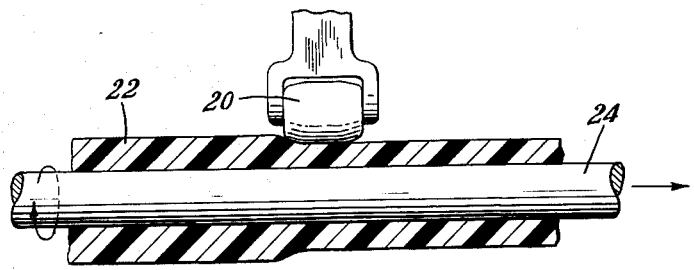

More specifically, FIGURE 1 and FIGURE 2 show one embodiment of this invention comprising a set of rollers 20 which are held in a fixed position adapted to exert pressure upon the outer periphery of the thermoplastic pipe 22 containing a mandrel 24 therein as they rotatably and longitudinally move past the rollers 20. The net result is a reduction in the thickness of the pipe 22 and an orientation in both a circumferential and longitudinal direction. In order to achieve a gradual reduction in thickness, the pipe 22 can be repassed subsequent to a changing in the position of the rollers 20 or more than one set of rollers can be placed along the pipe's path of travel in such a way that a reduction takes place at each set.

Figure 3:
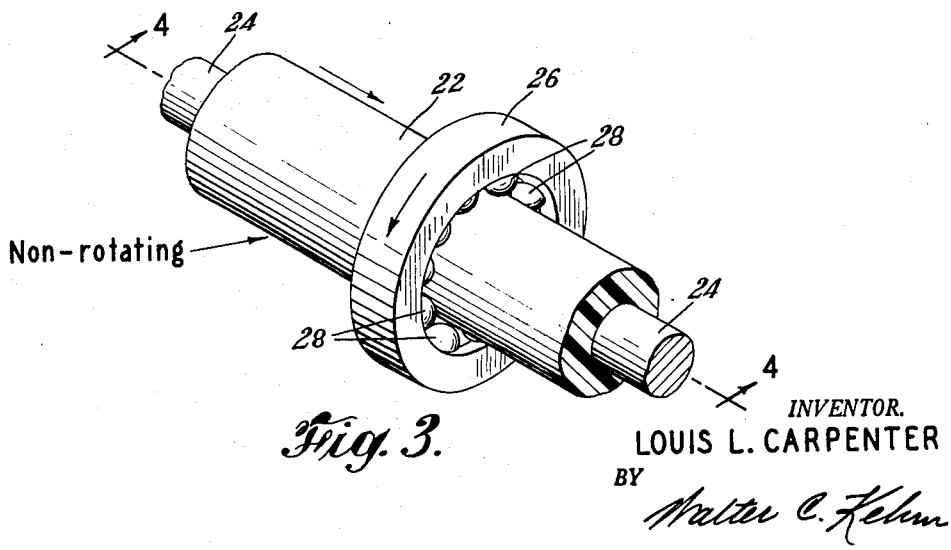
FIGURE 3 represents a perspective view of a ball-bearing concentric collar acting on the outer periphery of a thermoplastic pipe and FIGURE 4 is a sectional view thereof along section 4—4 of FIGURE 3.
Figure 4:
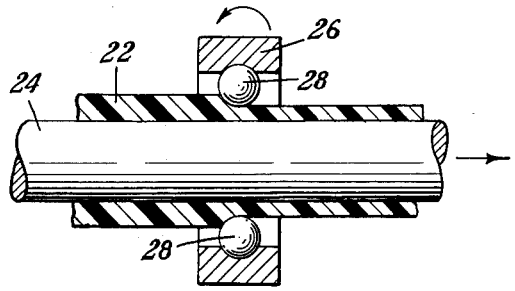

FIGURE 3 and FIGURE 4 show another mode of cold-working thermoplastic pipe 22. Here a concentric ball-bearing collar 26 having balls 28 on the inside surface of said collar 26 is so positioned and adapted that the balls 28 exert rolling pressure upon the outer periphery of the thermoplastic pipe 22 containing a mandrel 24 therein as they passed longitudinally through the rotating collar 26. Again, the net results were a reduction in the pipe's thickness and orientation of the thermoplastic material in circumferential and longitudinal directions. Although the pipe 22 is shown as non-rotating, obviously it could be rotated in an opposite direction to that of the collar 26 or even rotated in the same direction provided the angular velocity of the pipe 22 is not equal to that of the collar 26. This should be obvious because in order to effectuate circumferential orientation, there has to be relative difference in rotational motion between the collar 26 and the pipe 22.

Figures 5, 7:
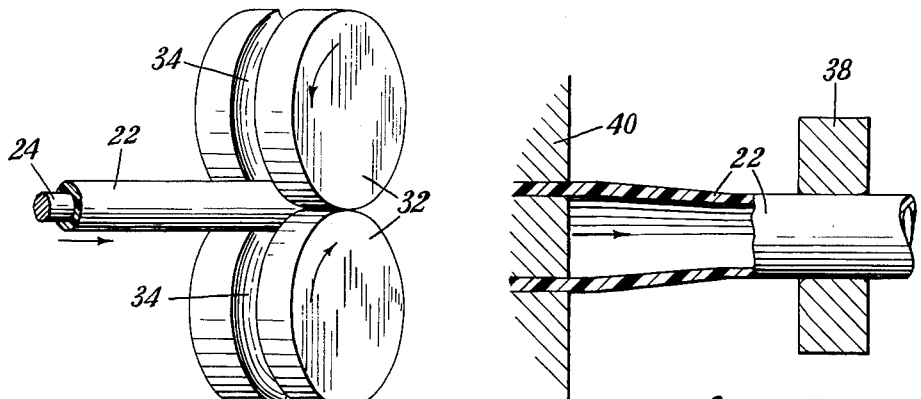
FIGURE 5 is a perspective view of a thermoplastic pipe entering a nip formed by two rotating grooved rollers and FIGURE 6 is a front view of these rollers so arranged.
FIGURE 7 represents a partial sectional side view of a twisting method of orientation by a twisting concentric collar.
Figure 6:
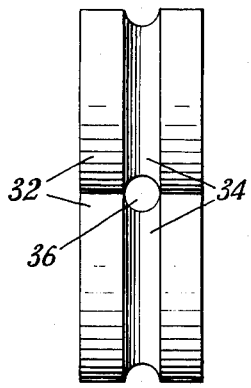

FIGURES 5 and 6 illustrate still another mode of cold-working a thermoplastic pipe 22 containing a mandrel 24 therein. Here the pipe 22 is passed longitudinally into the grooved portions 34 of the two grooved rotating rollers 32 as shown in FIGURE 5. Although not readily apparent at first glance, there is actual rotational pressure exerted about the axis of the tube and thus orientation in a circumferential direction by reason that the circular section of the thermoplastic pipe 22 is alternatively squeezed into an oval shape as it approaches the grooved portions 34 and then squeezed back into circular form as it passes through the circular orifice 36 where the grooved portions 34 meet to form a circular passageway. Thus during such working, the pressure is considered as rotational with the circumferential forces caused by the alternating deformations from oval back to circular shape giving rise to circumferential orientation. In order that the circumference of the thermoplastic pipe 22 be uniformly and equally deformed, the pipe can also be rotated to a different position between passes, or be separately rotated during such deformations.

FIGURE 7 shows still another mode of cold-working contemplated in this invention. Here a twisting clamp collar 38 is concentrically and snugly placed about the thermoplastic pipe 22 and rotated as the pipe 22 is longitudinally passed through to twist the latter, and thereby, circumferentially orient the pipe 22. The twisting clamp collar 38 while being rotated continuously or intermittently is either moved in the direction of the moving pipe 22 at a lineal rate lower than the longitudinal lineal rate of the pipe 22 or else kept lineally stationary. Although no mandrel is shown in FIGURE 7, it could, if desired, be inserted into the pipe if the intrinsic properties of the particular thermoplastic material demanded it. For example, a low degree of rigidity of the material could demand a mandrel. Also, although the pipe in FIGURE 7 is shown as being reduced in thickness, this is not a necessary consequence for desired orientation in this twisting method. Still also, although the set up shown shows the pipe emanating from the extruder die 40, the pipe could have been obviously already extruded since the source of pipe is not critical.

The following examples serve to support the efficacy of this invention but are not intended to limit it thereto:

EXAMPLE I

The arrangement and type of apparatus used in this example is shown in FIGURES 1 and 2. Samples of extruded polyethylene were placed over a 5/8" diameter steel mandrel (snug fitting, i.e. the diameter of the mandrel being slightly larger than the inner diameters of the pipes) and set up in a lathe at room temperature. A knurling tool consisting of two smooth rollers of 1/2" diameter were so mounted with relation to the outer periphery of the pipe that the rollers made a 3–5° angle with the pipe surface with sufficient pressure to deform the polyethylene pipe. The knurling tool was then traversed along the length of the pipes two times (two passes) to effect a gradual reduction in pipe thickness and a consequential plastic flow in circumferential and longitudinal directions.

Table I below summarizes the results of bursting tests that were conducted on extruded polyethylene having the following physical properties:

A high-pressure process polyethylene having a density of 0.922 and a melt index of 0.1 as determined by ASTM test method D-1238-52T at 190° C. and 44 p.s.i.

It is apparent from Table I that pipes which were subjected to the above-described cold-working treatment have a considerably higher circumferential bursting stress as compared with the original (control) extruded polyethylene pipe. The circumferential bursting stresses were calculated using the measured internal bursting pressures of the pipes, the pipes' wall thicknesses and inner diameters from a standard equation for hoop stress in thin-walled cylinders. In comparing the bursting strengths it is, of course, necessary to be cognizant of the fact that the cold-worked pipe samples have had their thicknesses reduced from the larger thicknesses of the extruded control samples. The truer comparison and the one more readily apparent is the comparison of the calculated circumferential bursting stresses which take into account the relative difference in thickness between the control and cold-worked samples. This latter comparison clearly shows an increase in the controlling circumferential bursting stresses.

In Table I below, the "A" and "B" cold-worked samples were derived from the "A" and "B" extruded control samples, respectively.

Table I

| Type of sample | Average outside | Diam. (in.) inside | Percent decrease in wall thickness | Internal bursting press. (p.s.i.)* | Calculated circumferential bursting stress (p.s.i.) |
|---|---|---|---|---|---|
| Extruded Control Pipe A | 0.842 | 0.615 | | 500 | 1,350 |
| Cold Worked Pipe A | 0.812 | 0.631 | 16 | 400 | 1,400 |
| Cold Worked Pipe A | 0.812 | 0.627 | 25 | 450 | 1,520 |
| Extruded Control Pipe B | 0.840 | 0.616 | | 500 | 1,380 |
| Cold Worked Pipe B | 0.777 | 0.623 | 34 | 500 | 2,030 |

*"A" Samples were tested at 23° C. "B" Samples were tested at C. 20° These pipes plugged up at both ends were burst and tested by a conventional pressure hand-hydraulic pump having a pressure gage thereon.

EXAMPLE II

FIGURES 5 and 6 illustrate the set up used in this example and is another type and arrangement of apparatus that may be used in this invention. Polyethylene pipe was cold-worked on the mandrel at room temperature as it passed through the grooved portions of the rollers. Samples of pipe of ¼" inner diameter and ½" outer diameter were formed from pipe having originally a ¼" diameter and a ⅝" outer diameter. The percent reduction in wall thickness was approximately 33% with an elongation of length of the pipe of two times the original length.

The data in Table II below compares the controlling circumferential tensile bursting stresses of cold-worked polyethylene pipe samples as manufactured by the above-mentioned method to extruded polyethylene pipes having approximately the same magnitude, to wit: a 0.25" inner diameter and a 0.54" outer diameter. The bursting stresses were calculated in the same manner as in Example I. It is evident that the controlling circumferential bursting stress of the cold-worked polyethylene samples sustained a desirable increase.

Table II

| Type of resin | Calculated circumferential tensile bursting stress of the ext. pipe; p.s.i.* | Calculated circumferential tensile bursting stress of the cold-worked pipe; p.s.i.* | Percent increase in tensile circumferential bursting stress |
|---|---|---|---|
| C | 1,600 | 1,800 | 12 |
| D | 1,500 | 1,900 | 27 |

*Determined at 80° C. Resin C—A polyethylene resin having a density of 0.942 and an ASTM D-1238-52T flow index of 0.9 at 260° C. and 44 p.s.i. Resin D—A polyethylene resin having a density of 0.951 and an ASTM D-1238-52T flow index of 0.05 at 190° C. and 44 p.s.i.

As has been previously pointed out, the degree of orientation or the magnitude of the deformations incurred by cold-working must occur gradually. If not done gradually, the ever present risk of a decrease in bursting strength is strained. The data in Table III exemplifies this.

EXAMPLE III

The polyethylene samples were handled with the same set up as shown in FIGURES 1 and 2 and the same procedure of Example I, except that in this example, the reduction of pipe wall thickness was effected in one pass rather than two passes. Moreover, the type of polyethylene used in this example was identical to that of Example I and the bursting stresses calculated in the same manner as described therein.

It is apparent that the cold-worked sample E2 experienced too great a deformation in wall thickness or degree of orientation with one pass as is evidenced by its lower circumferential tensile bursting stress as compared to the extruded control pipe sample E, and the cold-worked sample E1 which although was cold-worked with only one pass was nevertheless not greatly deformed. The ostensible physical reason here being that with too great a deformation at any one time or pass in which the ultimate strength of the thermoplastic material is exceeded, the thermoplastic material is permanently damaged consequently resulting in a decrease in bursting strength.

In Table III below, the "E" cold-worked samples 1 and 2 were derived from the "E" extruded control sample.

Table III

| Type of sample | Wall thickness (in.) | No. of passes | Percent decrease in wall thickness | Ambient temp., ° C. | Calculated circumferential bursting stress; p.s.i. |
|---|---|---|---|---|---|
| Extruded Control Pipe E | 0.113 | 0 | 0 | 20 | 1,064 |
| Cold-worked Pipe E1 | 0.074 | 1 | 34 | 20 | 1,555 |
| Cold-worked Pipe E2 | 0.057 | 1 | 49.5 | 20 | 790 |

Although no limiting criticalities were readily evident in the various set ups used in this invention aside from the yield value, the ultimate tensile strength, the first-order transition temperature and the second-order temperature limitations, it should be evident in order to optimize any particlular set up certain conditional criticalities might arise dictating their observance for optimum performance. Although in most of the types of methods described above, a mandrel was inserted into the thermoplastic pipe while it was being cold-worked to cause a simultaneous reduction in thickness and elongation of the pipe, it is not absolutely necessary that this be done. This particularly holds true in the method where twisting of the pipe is used to effectuate circumferential orientation. Also, for example, for optimum performance such things might have to be determined; the number of rollers to be used in FIGURE 1, or what speed to use for the various moving parts involved, or at higher speeds of the various parts involved it may be necessary to use a cooled mandrel or the entire operation may have to be carried out with the entire apparatus immersed in a cooling fluid or gas, etc. These conditions could be determined by one having ordinary skill in this art.

Therefore, although various forms of this invention have been disclosed herein, it is to be understood that changes in the details thereof may be made without departing from the spirit and scope of the invention.

What is claimed is:

1. A method of increasing the bursting strength of thermoplastic pipe which comprises cold working a solid extruded thermoplastic pipe by inserting a mandrel therein having an outer diameter at least equal to the inner diameter of the pipe, and then applying deformative pressure in at least one pass from a rotatable pressure means adapted to simultaneously transmit sufficient force in longitudinal and circumferential directions to the outer periphery of said pipe deforming the same and causing the thermoplastic to flow and orient itself in such directions while maintaining the internal diameter of the pipe substantially the same while keeping the thermoplastic at a temperature below its first-order transition temperature and above its second-order transition temperature with the deformations at any one pass not exceeding its ultimate tensile strength while above its yield value.

2. The method of claim 1 in which the thermoplastic material is polyethylene and in which its temperature is maintained between room temperature and up to about 5° F. below its first-order transition temperature.

3. A method of increasing the bursting strength of thermoplastic pipe which comprises cold working a solid extruded thermoplastic pipe by inserting a mandrel therein having an outer diameter at least equal to the inner diameter of said pipe, and then applying deformative pressure in multiple passes from a rotatable pressure means adapted to simultaneously transmit sufficient force in longitudinal and circumferential directions to the outer periphery of said pipe deforming the same and causing the thermoplastic to flow and orient itself in such directions to simultaneously effect a reduction in thickness and elongation of said pipe while maintaining the internal diameter of the pipe substantially the same while keeping the thermoplastic at a temperature below its first-order transition temperature and above its second-order transition temperature with the deformations at any one pass not exceeding its ultimate tensile strength while above its yield value.

4. The method of claim 3 in which the thermoplastic material is polyethylene and in which its temperature is maintained between room temperature and up to about 5° F. below the first-order transition temperature of the polyethylene and in which the reduction in pipe thickness is at least 15%.

5. The method of claim 4 in which the thermoplastic material is polyethylene and in which its temperature is maintained between room temperature and up to about 5° F. below the first-order transition temperature of the polyethylene and in which the reduction in pipe thickness is between 25–35% inclusive.

References Cited by the Examiner

UNITED STATES PATENTS

| | | | |
|---|---|---|---|
| 2,307,817 | 1/43 | Austin | 18—57 |
| 2,317,687 | 4/43 | Larchar | 18—14 |
| 2,336,397 | 12/43 | Harrington | 80—62 |
| 2,414,776 | 1/47 | Stephenson et al. | |
| 2,644,983 | 7/53 | Curtiss | 18—55 XR |
| 3,089,187 | 5/63 | Wolfe | 18—55 XR |

FOREIGN PATENTS

| | | |
|---|---|---|
| 561,337 | 8/58 | Canada. |
| 578,361 | 6/59 | Canada. |

OTHER REFERENCES

Mechanical Properties of Polymers, L. E. Nielse, Reinhold Pub. Corp., New York, 1962, pages 11–16 relied upon.

ALEXANDER H. BRODMERKEL, *Primary Examiner.*

WILLIAM J. STEPHENSON, *Examiner.*